United States Patent
O'Neill

(10) Patent No.: US 6,623,348 B1
(45) Date of Patent: Sep. 23, 2003

(54) METHOD AND APPARATUS FOR SLAUGHTERING AND PROCESSING ANIMALS

(76) Inventor: Richard V. O'Neill, 5809 S. 135th St., Omaha, NE (US) 68137

( * ) Notice: Subject to any disclaimer, the term of this patent is extended or adjusted under 35 U.S.C. 154(b) by 0 days.

(21) Appl. No.: 09/900,772

(22) Filed: Jul. 6, 2001

Related U.S. Application Data

(60) Provisional application No. 60/216,296, filed on Jul. 6, 2000.

(51) Int. Cl.[7] .......................... A22C 5/16; A22C 17/12; A22C 25/17; A22C 21/00
(52) U.S. Cl. .................................... 452/133
(58) Field of Search .................. 452/125, 133, 452/131, 132, 128, 130, 127, 107

(56) References Cited

U.S. PATENT DOCUMENTS

| | | | |
|---|---|---|---|
| 77,724 A | 5/1868 | Eschenlohr | |
| 1,484,618 A | 2/1924 | Blades | |
| 1,764,425 A | 6/1930 | Thomas | |
| 3,541,637 A | 11/1970 | Robison et al. | 17/50 |
| 4,229,860 A | 10/1980 | Irwin | 17/50 |
| 4,307,490 A | 12/1981 | Watkins et al. | 17/50 |
| 4,631,780 A | 12/1986 | Leining | 17/21 |
| 4,901,400 A | 2/1990 | Karubian | 17/21 |
| 5,167,569 A | 12/1992 | Davis | 452/130 |
| 5,180,328 A | 1/1993 | Davis | 452/128 |
| 5,326,310 A | 7/1994 | Gugg | 452/133 |
| 5,609,520 A | 3/1997 | Stewart | 452/131 |
| 6,394,889 B1 * | 5/2002 | O'Neill | 452/125 |

FOREIGN PATENT DOCUMENTS

| | | | |
|---|---|---|---|
| FR | 2571595 | 4/1986 | A22B/5/16 |
| GB | 337585 | 11/1930 | |

OTHER PUBLICATIONS

Luxar AccuVet; Accessories; http://www.accuvet.com/HTML.PAGES/AccessoriesBody.html; Jun. 15, 1999.

The CO2 Laser Advantage; Luxar AccuVet; Laser Advantage; http://www.accuvet.com/HTML.PAGES/TechBocy.html; Jun. 15, 1999.

* cited by examiner

*Primary Examiner*—Charles T. Jordan
*Assistant Examiner*—Judith A. Nelson
(74) *Attorney, Agent, or Firm*—Suiter West pc llo

(57) ABSTRACT

A method and apparatus are disclosed for processing non-homogeneous bodies. In exemplary embodiments, the present invention may be employed for aseptically slaughtering and processing animals for food, food products, chemicals, or hides. The methods and apparatus of the present invention require little or no human interaction with the animal carcass during slaughter and processing thereby reducing the possibility of injury to workers and contamination of the carcass through human contact.

42 Claims, 14 Drawing Sheets

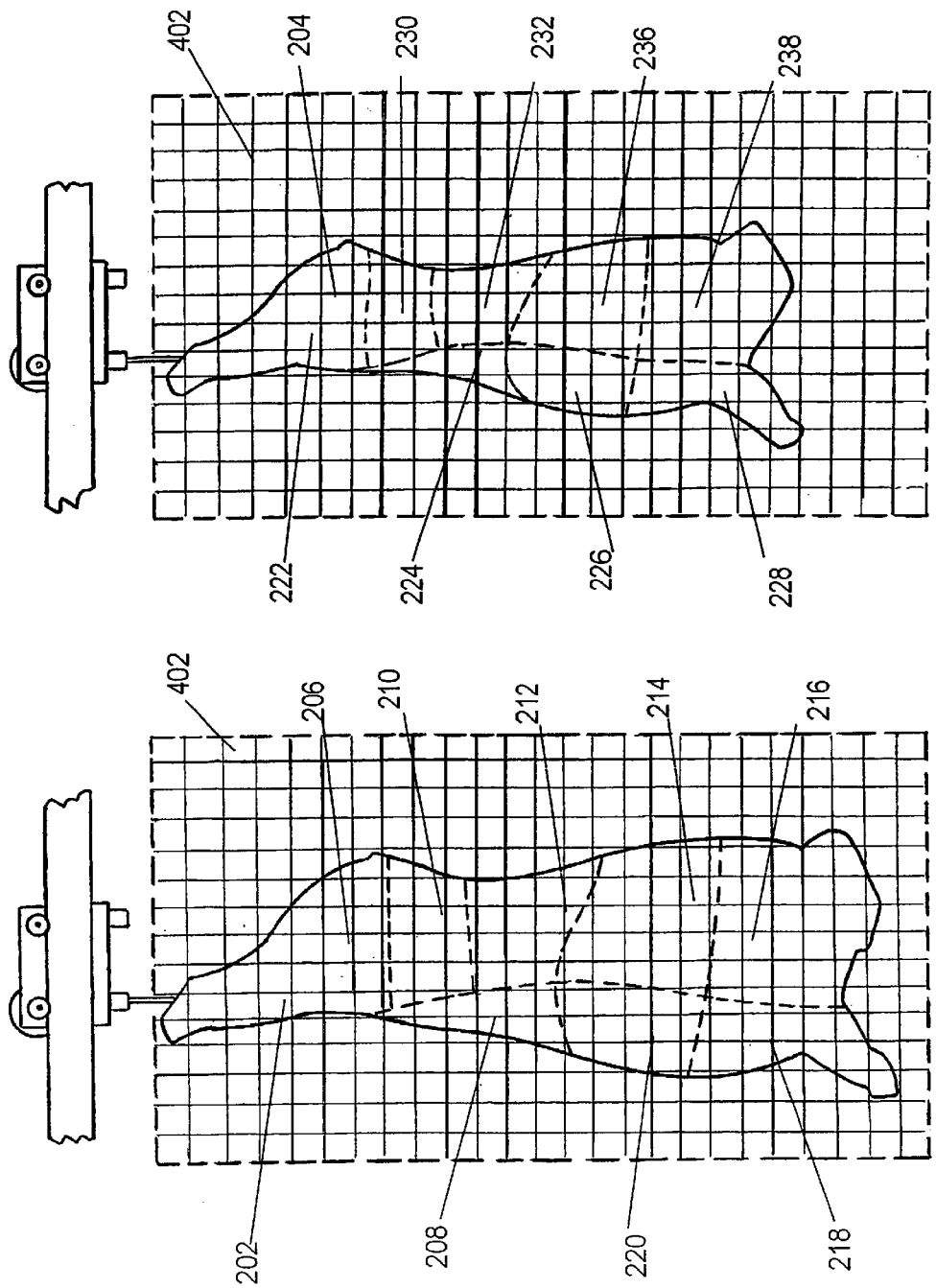

METHOD AND APPARATUS FOR SLAUGHTERING AND PROCESSING ANIMALS

CROSS-REFERENCE TO RELATED APPLICATIONS

The present application claims the benefit under 35 U.S.C. §119(e) of U.S. Provisional Application Ser. No. 60/216,296, filed Jul. 6, 2000. Said U.S. Provisional Application Ser. No. 60/216,296 is herein incorporated by reference in its entirety.

Incorporation by Reference

The following related commonly owned U.S. Patent Applications are herein incorporated by reference in their entirety:

| Applicant | Docket No. | Filing Date | Serial/Express Mail Label No. |
|---|---|---|---|
| O'Neill | ONE 99-3-1 | Jul. 6, 2000 | 09/610,823 |
| O'Neill | ONE 99-1-1 | Jul. 6, 1999 | 60/142,644 |

FIELD OF THE INVENTION

The present invention relates generally to methods and apparatus for slaughtering and processing animals for meat and/or hides, and more specifically to a method and apparatus for slaughtering and processing animals suitable for allowing the use of robotic cutting and processing equipment.

BACKGROUND OF THE INVENTION

Commercial slaughtering and processing of animals (cattle, sheep, swine, or the like) for meat, meat products, chemicals, hides and the like are labor intensive and expose the animal's carcass to possible microbiological contamination. Known methods for slaughtering and processing animals subject the animal's to substantial handling by several operators. Such handling increases the likelihood of microbiological contamination of the carcass. For example, the hides of animals being transported to slaughter may become soiled with contaminants such as the animal's fecal matter. These contaminants often contain microorganisms including pathogens such as *Escherichia Coli*, Salmonella, and the like. When the animals hide is removed, operators may contact this fecal matter and inadvertently transfer it to the carcass. Further, operators may acquire contaminates through other sources, such as through illness, and may likewise transfer these contaminants to the carcass when it is handled. For instance, an operator may inadvertently touch a contaminated portion of the hide wherein contaminants containing pathogenic microorganisms are acquired. Should, the operator then handle the carcass, these contaminants may be unknowingly transferred from the operator to the carcass where the microorganisms may be undetectable during inspection.

Handling of the animal's carcass during slaughter and processing also exposes the operators to unpleasant and dangerous working conditions. For instance, operators must utilize instruments such as knives, saws and the like to process the carcass. These instruments are kept extremely sharp so that cuts may be made quickly and efficiently. If the instruments are inadvertently mishandled for even an instant, serious injury to the operator may result.

Consequently, there exists a need for improved methods and apparatus for processing non-homogeneous bodies, and in particular, for aseptically slaughtering and processing animals for food, food products, chemicals, hides and the like so that human interaction with the animal carcass during slaughter and processing is reduced

SUMMARY OF THE INVENTION

The present invention is directed to novel methods and apparatus for processing non-homogeneous bodies. In exemplary embodiments, the present invention may be employed for aseptically slaughtering and processing animals for food, food products, chemicals, hides, and the like. The methods and apparatus of the present invention require little or no human interaction with the animal carcass during slaughter and processing thereby reducing the possibility of the possibility of injury to workers and contamination of the carcass through human contact.

In accordance with a first aspect of the present invention, a method is provided for aseptically slaughtering and processing animals for food, food products, chemicals, hides and the like. In one embodiment, the method comprises the steps of sensing at least a portion of an animal carcass being processed utilizing a sensing assembly capable of determining the orientation of the animal carcass portion. Points on the animal carcass portion where processing steps are to be performed are then identified based on the determined orientation of the animal carcass portion sensed by the sensing apparatus. The processing step or steps are then performed remotely utilizing robotic processing apparatus.

In accordance with a second aspect of the present invention, apparatus are provided for aseptically slaughtering and processing animals for food, food products, chemicals, hides and the like. In one embodiment, the apparatus includes a sensing device for sensing at least a portion of an animal carcass being processed. The sensing device is operably coupled to a controller capable of identifying a location on the animal carcass portion to perform at least one processing step based on the determined orientation of the carcass. The controller controls a robotic processing assembly capable of performing the processing step to perform the processing step.

In exemplary embodiments of the invention, the foregoing method and apparatus may be utilized to implement a variety of processing steps utilized in the slaughter and processing of animals including stunning the animal, slaughtering the animal, bleeding the animal, removal of the hide from the animal carcass, removal of the animal carcass's head, separation of the animals rectum, evisceration, removal of bones from a portion of the animal carcass, trimming of the animal carcass portion and the like as contemplated by one of ordinary skill in the art.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIGS. 2A and 2B are side elevational views illustrating use of the method and apparatus of the present invention to determine the orientation and size of an animal's carcass so that locations on the carcass for making incisions to trim the carcass into primal cuts may be made;

DETAILED DESCRIPTION

Reference will now be made in detail to the presently preferred embodiments of the invention, examples of which is illustrated in the accompanying drawings.

Referring generally to FIGS. 1A through 8, methods and apparatus for slaughtering and processing animals for food, food products, chemicals, hides, and the like are described. In the exemplary embodiments shown, the method and apparatus may be employed by a processing facility such as a "meat packing house" or "slaughterhouse." Such a processing facility typically utilizes a conveyer system for transporting the carcass of a slaughtered animal though the various dressing and butchering operations required to ultimately reduce the animal into cuts of meat for sale to consumers. In such a meat processing facility, the animal is first stunned. The animal is then hoisted into a hanging position by its hind legs and the animal's throat is marked (cut) so that the jugular veins in its neck may be severed to bleed the animal. The animal's carcass may then be suspended by the hocks of its hind legs on trolleys or hooks of the conveyor system. The hooks are pivotally supported via hook brackets having wheels that engage and roll on a monorail rigidly mounted to a supporting structure such as the ceiling and walls of the facility. In this manner, the animal may be moved from one processing station or operation to the next while supported on the monorail by the hooks. In FIGS. 1A through 8, the present invention is shown, in an exemplary embodiment, as being employed in the slaughter and processing of beef cattle for the production of meat or hide. It should be appreciated, however, that the methods and apparatus of the present invention may likewise be utilized in the processing of other meat or hide producing animals such as swine (hogs), sheep, horses, American bison, and the like.

Figure 1A:
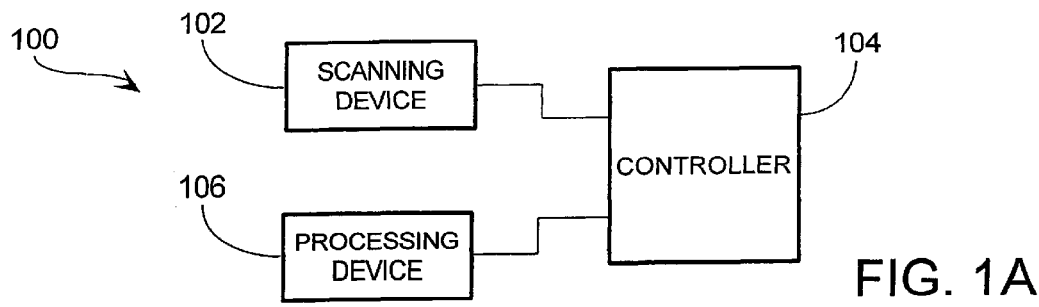
FIGS. 1A, 1B, 1C and 1D are block diagrams generally illustrating apparatus for slaughtering and processing animals in accordance with exemplary embodiments of the present invention.
Figure 1B:
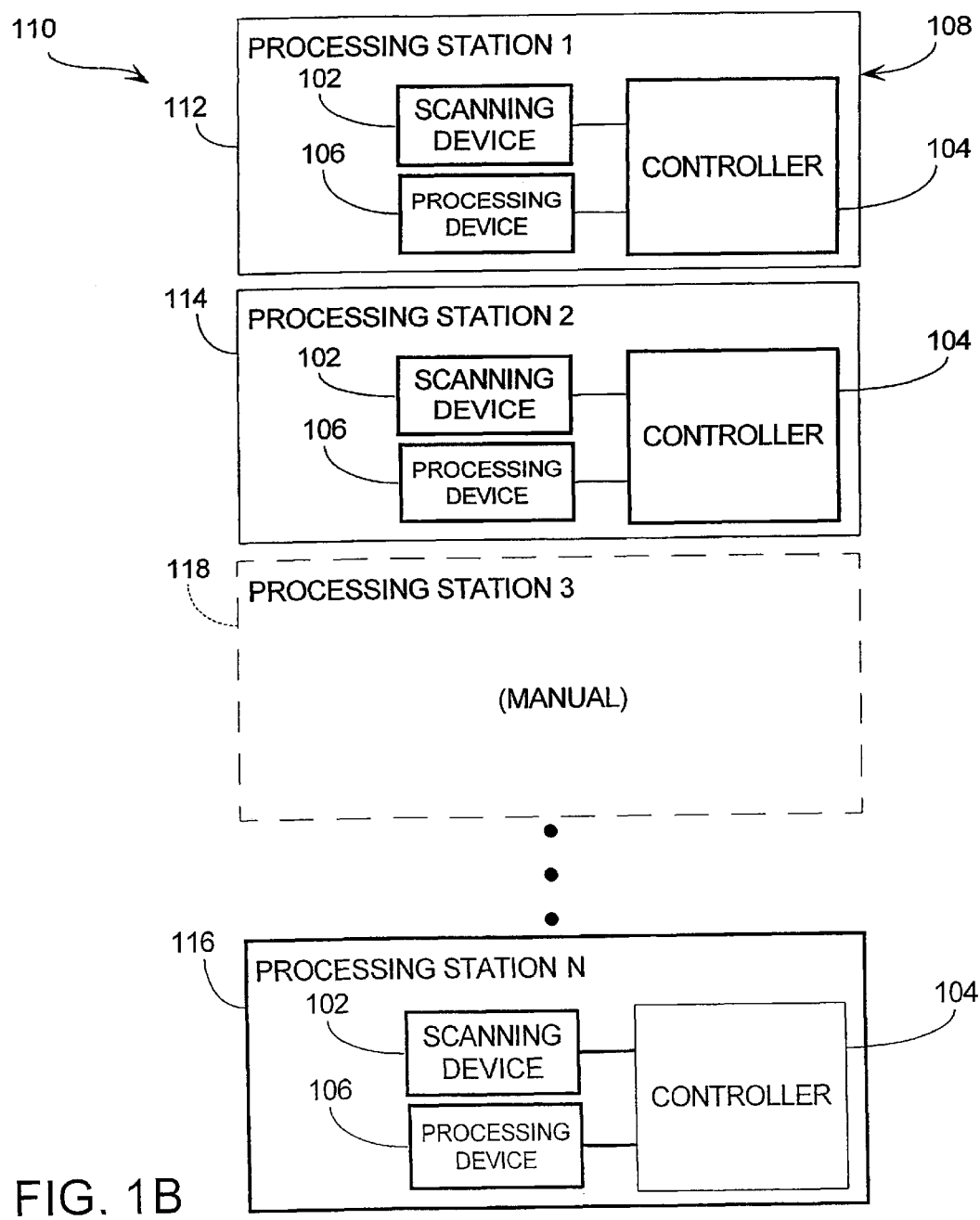
Figure 1C:
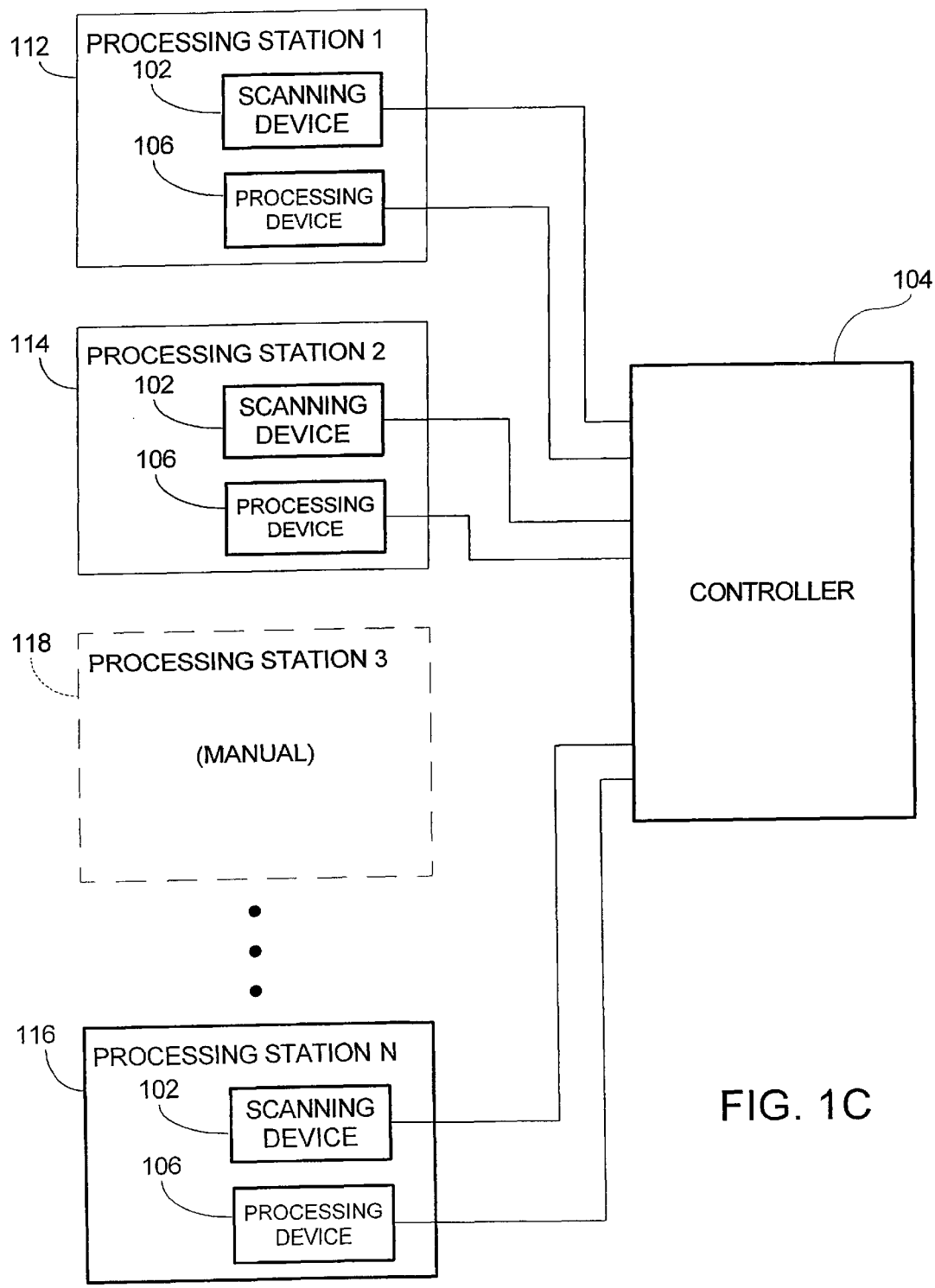

Turning now to FIGS. 1A, 1B and 1C, block diagrams illustrating exemplary apparatus for slaughtering and processing animals in accordance with the present invention are described. As shown in FIG. 1A, the processing apparatus 100 utilizes at least one sensing device 102 for inputting information suitable for determining of the size and orientation of the live animal, the animal's entire carcass, a portion of the animal's carcass, a primal cut, a cut, or the like [hereinafter collectively referred to as "carcass"]. Such information includes, but is not limited to, the shape of the carcass including its height, width, and depth, the contour of the surface of the carcass, and the position of the carcass relative to the processing apparatus 100. In an exemplary embodiment, the sensing device 102 may be comprised of one or more cameras each capable of generating an image of the carcass which is transmitted to a controller 104 as a series of electrical impulses. Alternatively, other sensing technologies may be used. For example, sensing devices 102 that are suitable for use by processing apparatus 100 may alternately include laser scanning devices, ultrasonic devices, infrared devices, and the like as contemplated by one of ordinary skill in the art. The sensing device 102 is operably coupled to a controller 104 that is capable of identifying a location on the animal carcass portion to perform one or more processing steps based on the determined orientation of the carcass.

In exemplary embodiments of the invention, the foregoing apparatus may be employed to implement a variety of processing steps utilized in the slaughter and processing of animals including stunning the animal, slaughtering the animal, bleeding the animal, removal of the hide from the animal carcass, removal of the animal carcass's head, separation of the animals rectum, evisceration, removal of bones from a portion of the animal carcass, trimming of the animal carcass portion and the like as contemplated by one of ordinary skill in the art. Exemplary processing stations are discussed further herein below in conjunction with FIGS. 7 through 9.

Referring now to FIGS. 2A and 2B, the carcasses 202, 204 of animals being processed are generally non-homogeneous in nature. Thus, each carcass 202,204 will likely have a somewhat different size and shape depending primarily on the size and condition of the animal before slaughter. For instance, the carcass of a first animal 202, shown in FIG. 2A, may be substantially larger than the carcass of a second animal 204, shown in FIG. 2B. Consequently, important features of the carcasses 202,204 such as bones, muscles, tendons, internal organs, veins or arteries and the like cannot be located utilizing existing automated processing technologies designed for use with homogeneous products making the performance of processing steps such as hide removal, evisceration, and trimming of the carcasses 202, 204 into primal cuts 206–236, or trimming of primal cuts 206–236 into cuts (not shown) for sale or use impossible.

Figure 3:
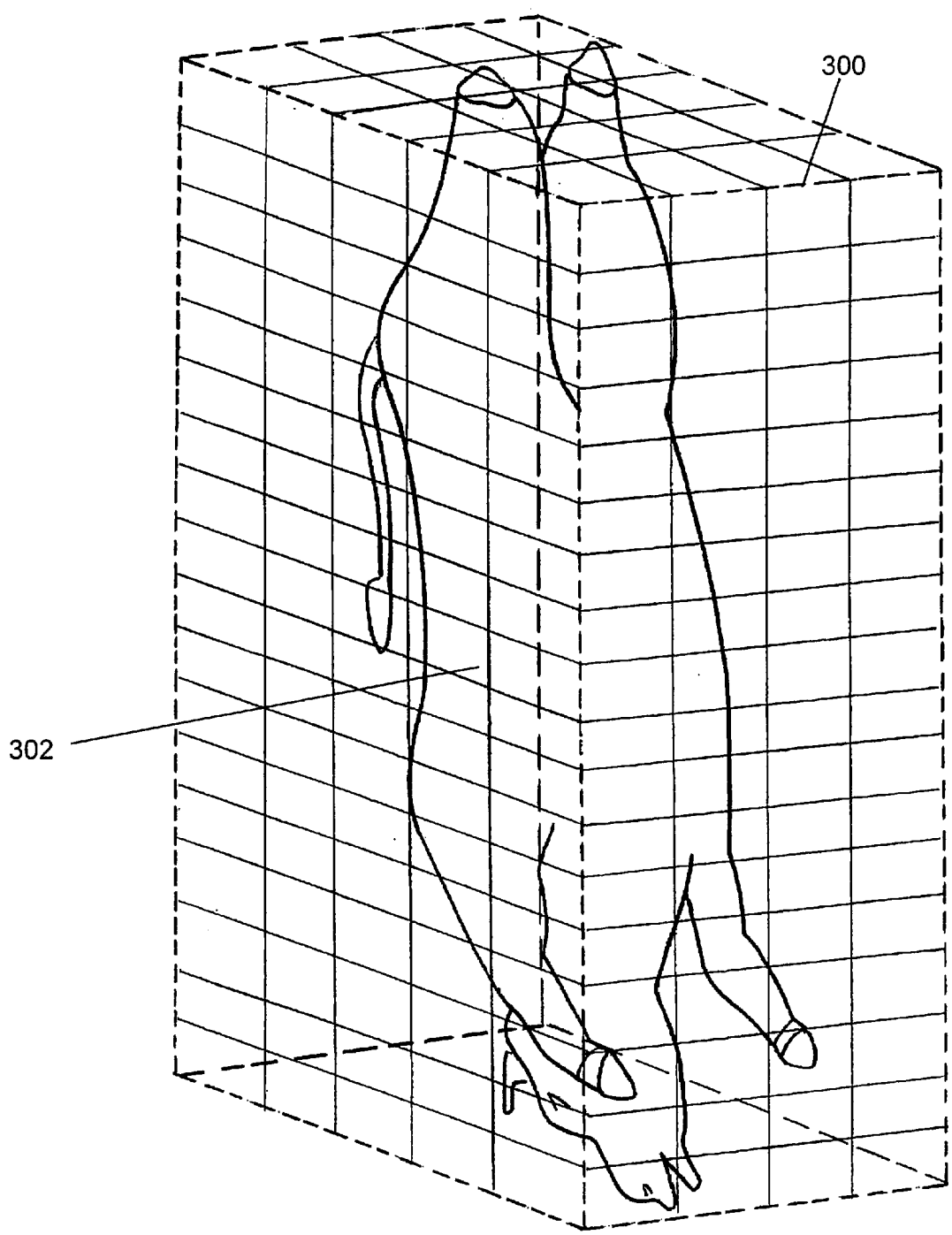
FIG. 3 is a perspective view illustrating generated model of the carcass having a grid pattern overlain thereon in accordance with one embodiment of the present invention.

In accordance with an exemplary embodiment of the present invention, shown in FIG. 3, a grid pattern 300 may be used to determine the size, shape, and orientation of the carcass 302 so that important features of the carcass 302 may be identified and located. The identified features may then be used to ascertain the location or locations on the carcass 302 where a particular process step or group of process steps are to be performed. In one embodiment, shown in FIGS. 4, the controller 104 may utilize information received from the sensing devices 102 to generate a three dimensional virtual model of the carcass 400 (shown displayed graphically on a display 404 of the controller 104). A grid pattern 402 is then overlain onto the model 400. Alternately, as shown in FIGS.

Figure 4:
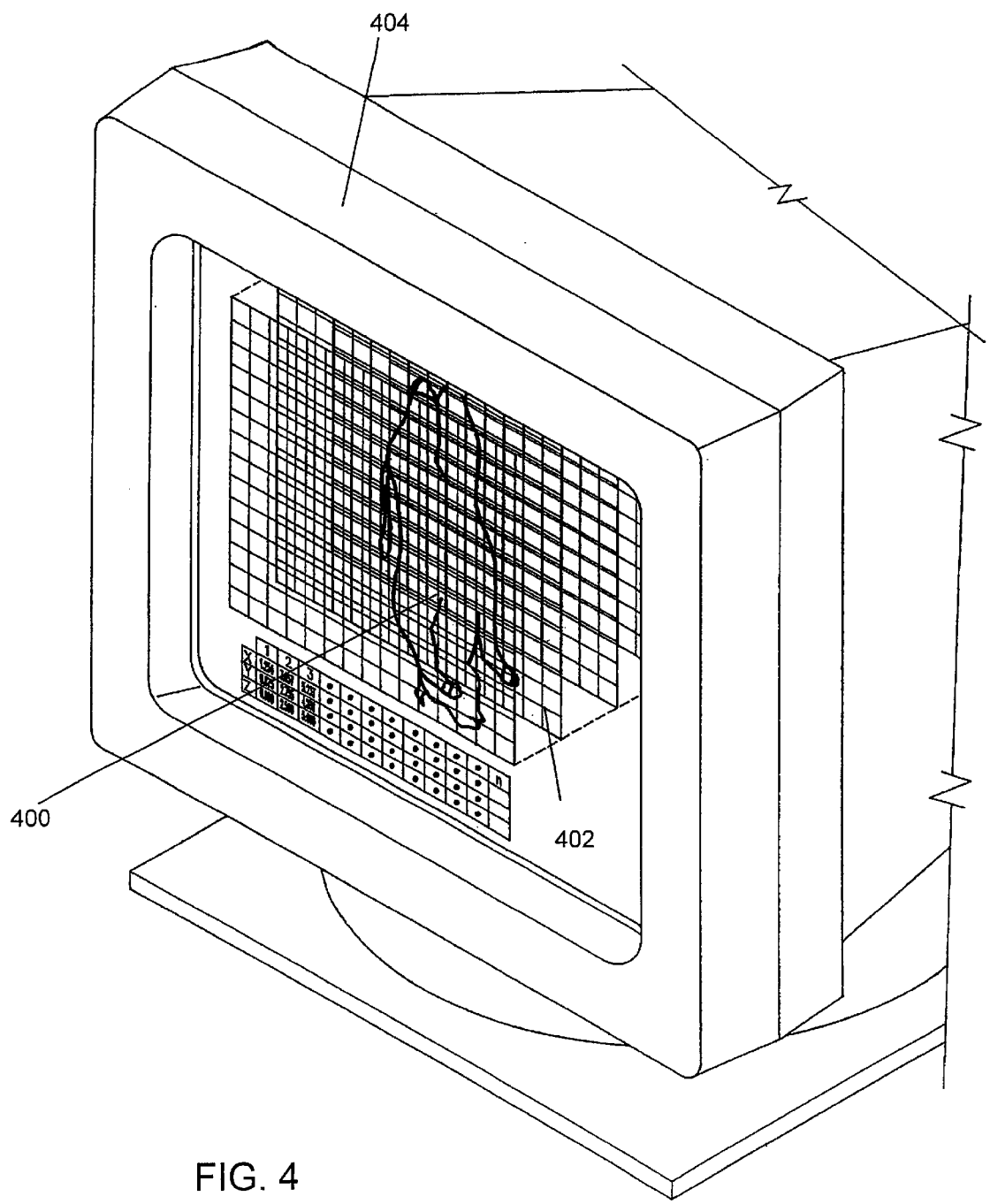
FIG. 4 is a perspective view illustrating a controller display capable of displaying the model in accordance with and exemplary embodiment of the present invention.

2A and 2B, the grid pattern 402 may be physically overlain onto the carcass utilizing projection apparatus (not shown) and inputted by the sensing devices 102 and included in the generated model 400 (FIG. 4).

The controller 104 may next identify important features of the carcass and determine the location of each identified feature in the model 400 with respect to a grid or grids 404 of the grid pattern 402. Once identified and located, these features may be used to identify a location on the carcass 302 (FIG. 3) to perform one or more processing steps. For instance, the controller 104, using a predetermined algorithm, may identify a particular grid or grids in which the processing step or steps are to be performed wherein the grid or grids are related to the grid or grids containing the identified feature. The controller 104 may then cause a robotic processing assembly 106 to perform the step at the identified location.

Turning again to FIGS. 1B and 1C, various processing steps may be implemented at separate processing stations 108 within the processing facility 110. The processing stations 108 may include processing devices 106 each suitable for performing one or more processing steps required to slaughter the animal and reduce its carcass to the cuts desired. For example, as shown in FIGS. 1B and 1C, a processing facility 110 may include a first processing station, "PROCESSING STATION 1" 112, a second processing station, "PROCESSING STATION 2" 114, up to N number of processing stations, "PROCESSING STATION N" 116. Optionally, the processing facility 110 may further include processing stations, "PROCESSING STATION 3" 118, wherein one or more processing steps are performed manually, e.g., by a human operator instead of or in addition to a robotic processing device 106.

The carcass is moved from one processing station or operation to the next via a suitable transport system such as a monorail, conveyor or the like. Thus, as an animal is processed in the processing facility 110, its carcass, or portions thereof, are transported from processing station to processing station 108 to be trimmed into increasingly smaller cuts of meat (sides, quarters, primal cuts, cuts, and the like). Exemplary meat cuts are described in "The Meat Buyer's Guide" published by the National Association of Meat Purveyors (NAMP) which is herein incorporated by reference in its entirety.

In one embodiment, shown in FIG. 1B, processing stations 108 may be substantially self-contained. Each such processing station 108 may include processing apparatus 100 including at least one sensing device 102, a controller 104, and at least one processing device 106 operating independently of the processing apparatus 100 of other processing stations 108. Alternately, as shown in FIG. 1C, multiple processing stations 108 may be controlled by a common controller. Each processing station 108 may include processing apparatus 100 including at least one sensing device 102, and at least one processing device 106. Preferably, the sensing and processing devices of each processing station 108 are coupled to a centrally located controller 118 that provides control of the processing apparatus of each processing station 108.

Figure 1D:
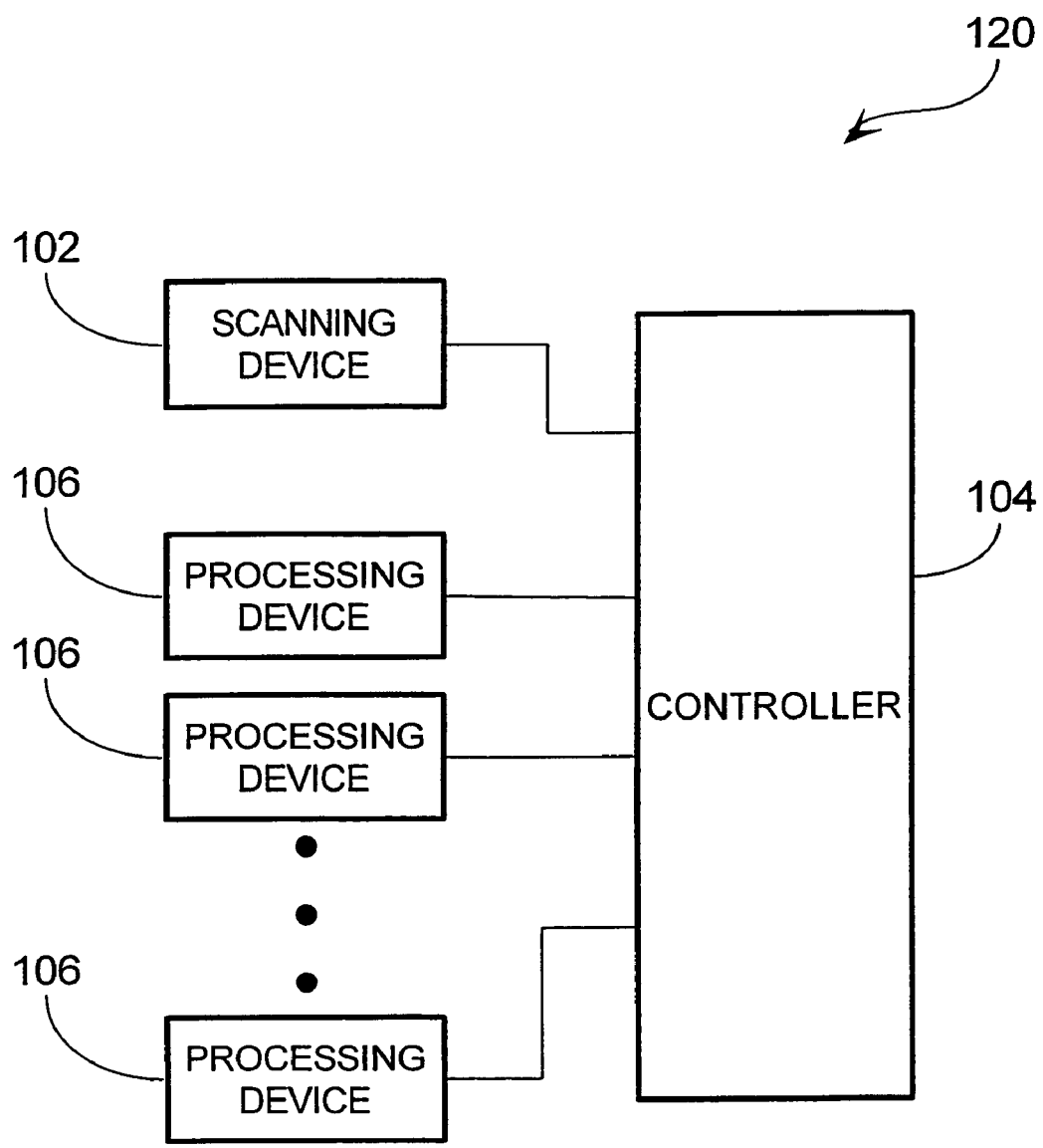

In accordance with yet another exemplary embodiment, a processing facility may be comprised of one or more processing stations capable of performing multiple processing steps. For instance, as shown in FIG. 1D, such a processing station 120 may include at least one sensing device 102 operably coupled to a controller 104. The controller 104 controls a plurality of robotic processing assemblies 106 each capable of performing one or more one processing step to the carcass. In this manner, several processing steps may be performed at a single processing station so that the animal carcass portion is not moved from station to station.

Figure 5:
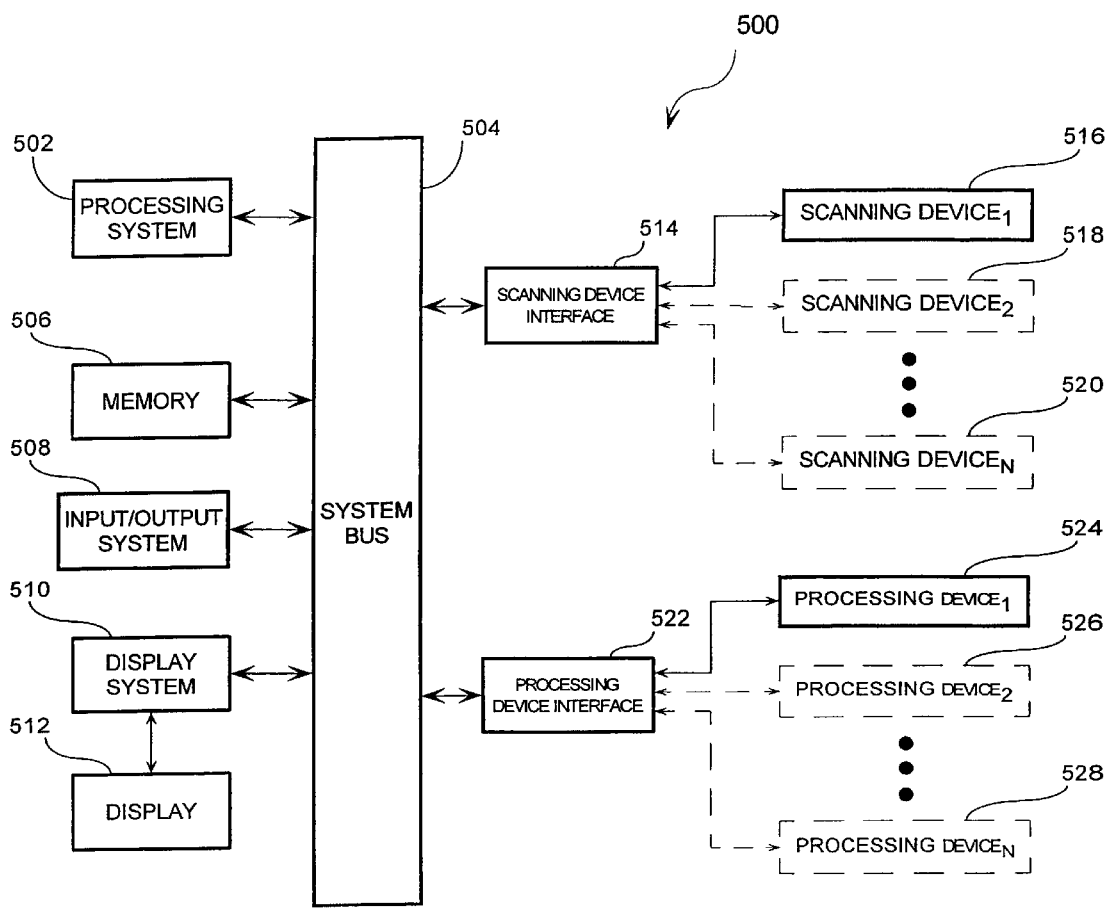
FIG. 5 is a block diagram illustrating the hardware system of an exemplary controller.

Referring now to FIG. 5, the hardware system of a controller in accordance with the present invention is shown. The hardware system 500 is controlled by a central processing system 502. The central processing system 502 includes a central processing unit such as a microprocessor or micro controller for executing programs, performing data manipulations and controlling the tasks of the hardware system 500. Communication with the central processor 502 is implemented through a system bus 510 for transferring information among the components of the hardware system 500. The bus 510 may include a data channel for facilitating information transfer between storage and other peripheral components of the hardware system 500. The bus 510 further provides the set of signals required for communication with the central processing system 502 including a data bus, address bus, and control bus. The bus 510 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on.

Other components of the hardware system 500 include memory 504 comprised of main memory and auxiliary memory. The main memory provides storage of instructions and data for programs executing on the central processing system 502. The main memory is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. Auxiliary memory provides storage of instructions and data that are loaded into the main memory before execution. The auxiliary memory may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory may also include a variety of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and the like. Other varieties of memory devices are contemplated as well.

The hardware system 500 may optionally include an auxiliary processing system which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 500 further includes a sensing device interface 514 for interfacing with one or more sensing devices 516–520 and a processing device interface 522 for interfacing with one or more processing devices 524–528. The sensing device interface 514 and processing device interface 522 may comprise one or more controllers or adapters for providing interface functions between the one or more sensing devices 516–520 and processing devices 524–528. For example, the sensing device interface 514 and processing device interface 522 may comprise a serial port, parallel port, universal serial bus (USB) port, IEEE 1394 serial bus port, infrared port, network adapter, radio-frequency (RF) communications adapter, universal asynchronous receiver-transmitter (UART) port, and the like as contemplated by one of skill in the art, for interfacing between corresponding sensing devices 516–520 and processing devices 524–528, respectively.

The hardware system 500 further includes a display system 512 for connecting to a display device 514, and an input/output (I/O) system 516 for connecting to one or more I/O devices. The display system 512 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like. The display device 514 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high gain emissive display (HGED), and so forth. The input/output system 516 may comprise one or more controllers or adapters for providing interface functions between the one or more I/O devices. For example, the input/output system 516 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, audio amplifier, etc. The input/output system 516 and I/O devices 518–522 may provide or receive analog or digital signals for communication between the hardware system 500 of the present invention and external devices, networks, or information sources. The input/output system 516 and I/O devices 518–522 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 500 of FIG. 5 by one having ordinary skill in the art would not depart from the scope or the spirit of the present invention.

Figure 6:
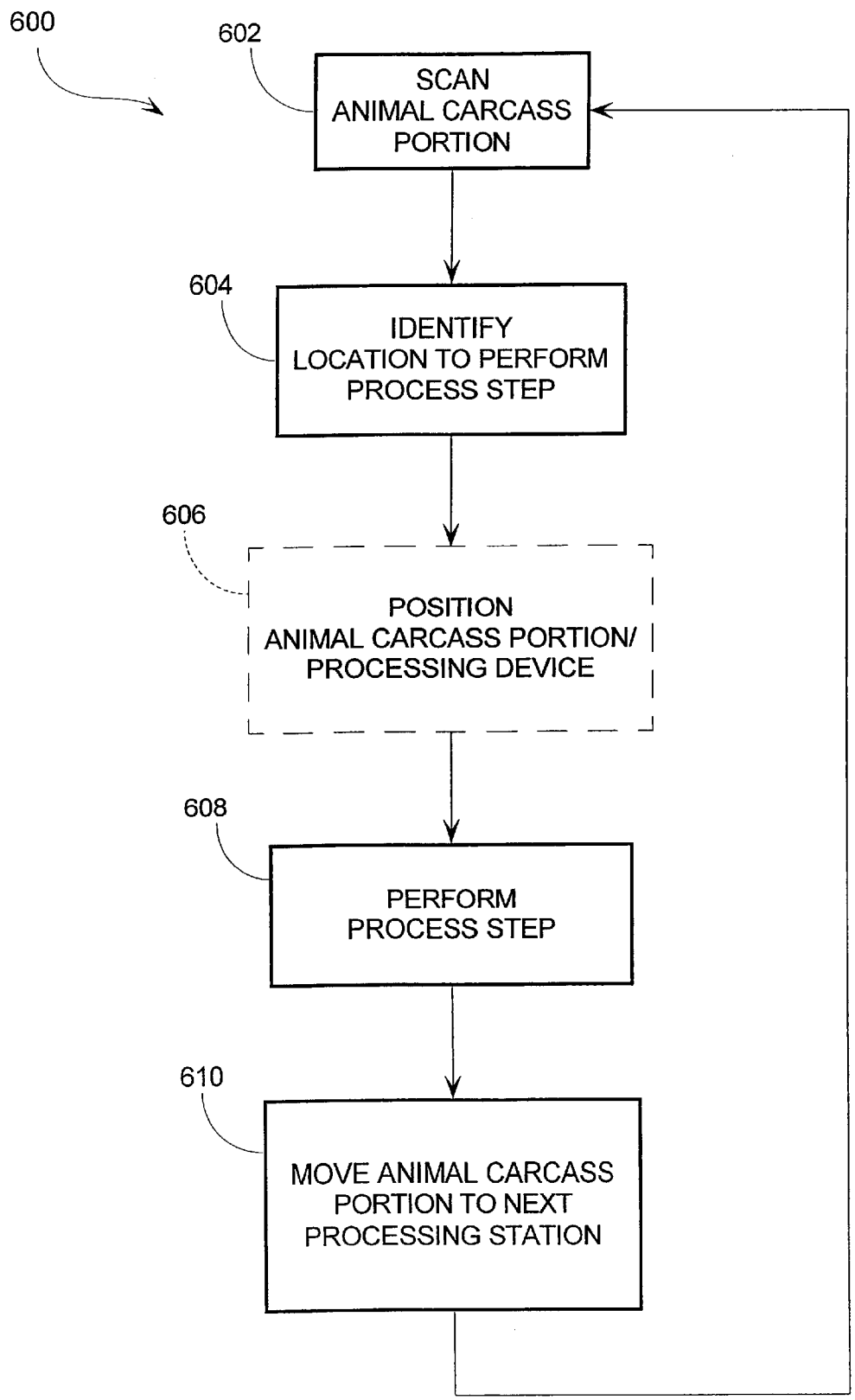
FIG. 6 is a flow diagram illustrating a method for slaughtering and processing animals in accordance with an exemplary embodiment of the present invention.

Referring now to FIG. 6, an exemplary method for processing animals for food, food products, chemicals, hides, and the like in accordance with the present invention in accordance with the present invention is described. The method 600 is implemented when a carcass is received at a processing station within a processing facility employing apparatus in accordance with the present invention. At least a portion of the carcass is scanned utilizing a sensing assembly capable of determining the orientation of the animal carcass portion at step 602. Points on the animal carcass portion where processing steps are to be performed are then identified based on the determined orientation of the animal carcass portion from the scan at step 604. For instance, as shown in FIGS. 2A, 2B and 3, and discussed above, the controller may overlay a grid pattern onto the image of carcass received from the sensing device. The controller then identifies important features of the carcass and determines the location of each identified feature with respect to a grid or grids of the grid pattern. If necessary the carcass may be re-oriented or, alternately, the processing device, repositioned so that the processing step may be performed at step 606. The processing step or steps are then performed remotely utilizing robotic processing apparatus at step 608. The carcass is then moved to the next processing station for further processing if necessary 610

Turning now to FIGS. 7 through 11, exemplary processing stations in accordance with exemplary embodiments of the present invention capable of implementing a variety of processing steps for slaughtering and processing an animal for meat, hide, or the like are shown. While the processing stations shown in FIGS. 7 through 11 are shown as physically separate stations, as described in the discussion of FIGS. 1B and 1C above, it should be appreciated that the processing apparatus utilized by these stations may also be implemented as part of a single processing station as described in the discussion of FIG. 1D.

Figure 7:
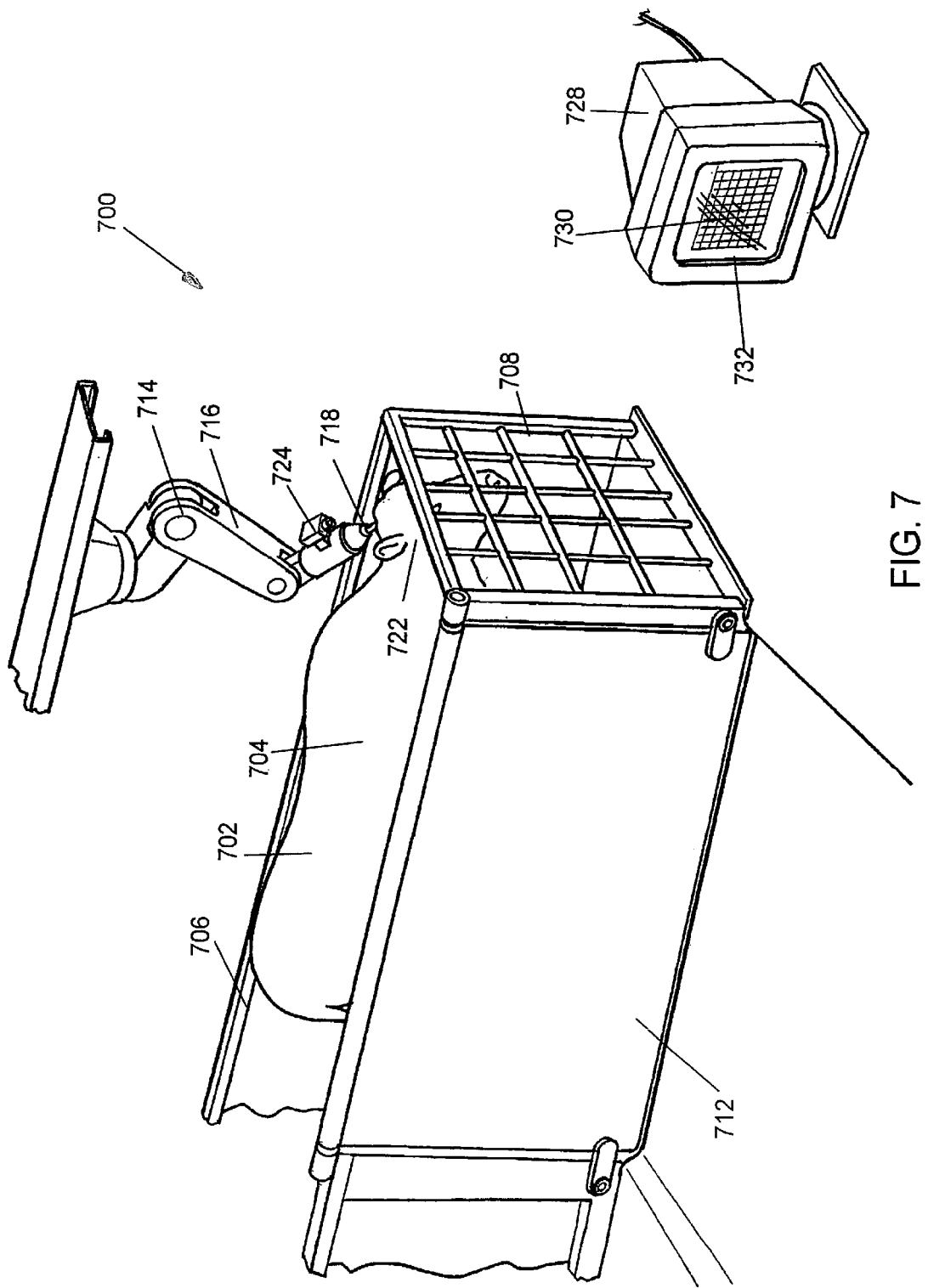
FIG. 7 is an perspective view of an exemplary process step comprised of stunning or killing the animal.

Referring now to FIG. 7, an exemplary processing station employing apparatus in accordance with the present invention is shown. The processing station 700 is used for stunning an animal 702 to cause unconsciousness so the animal 702 may be slaughtered and its carcass 704 processed for meat, hide, and the like. The processing station 700 includes an enclosure 706 into which the animal is herded or led. The enclosure 706 includes a forward wall portion 708 for restricting forward movement of the animal 702, and left and right side wall portions 710 & 712 spaced to limit side to side movement of the animal 702. The enclosure 706 may optionally include a gate (not shown) which is closed behind the animal 702 to prevent the animal from backing out of the enclosure 706 and to separate the animal 702 from other animals to be processed.

In accordance with the present invention, the processing station 700 includes a processing device 714 comprising an arm 716 to which a stunning device 718 is mounted. In the exemplary embodiment shown in FIG. 7, the stunning device 718 includes a bolt 720 that is thrust against the animal's head 722 by a blast of compressed air, an explosive charge, a spring, or the like. Optimally, the bolt impacts the animal's head 722 with sufficient force to stun the animal 702 rendering it unconscious without causing cessation of the pumping action of the heart. Alternately, other stunning technologies may be employed to stun the animal. For example, a stunning device employed by the present invention may utilize electrical shock to stun the animal.

As shown in FIG. 7, a sensing device 724 mounted to the arm 716 inputs information which is communicated to the controller (a display 728 of which is shown) controlling the processing device 714. The controller uses the information received from the sensing device 724 to locate the proper position of the animal's head 722 against which the stunning device 718 should be positioned to stun the animal efficiently and humanely. For example, as discussed supra, in an exemplary embodiment, the controller may utilize the inputted information to generate a three-dimensional model of the animal's head 722 on which a grid pattern 730 is overlain so that the size, shape, orientation, and movement of the animal's head 722 may be determined, and the point on the head 722 where the stunning device 718 should be positioned may be ascertained. The controller may then manipulate the arm 716 to properly position the stunning device 718 against the animal's head 722. Once positioned, the controller actuates the stunning device 718 driving the bolt 720 against the animal's head 722 to stun the animal 702 and render it unconscious. The controller may further use the information received from the sensing device 718 to provide a video display of the position and movement of the animal's head to an operator via the display 728. The operator may utilize the video display to monitor operation of the processing station 700, or alternately, to manually guide the arm 716 into position and actuate the stunning device 718 if it is desired that this function is not performed automatically by the controller. A door in side wall portion 712 may then open allowing the animal 702 to be removed from enclosure 706 for slaughter and processing of its carcass 704.

Figure 8A:
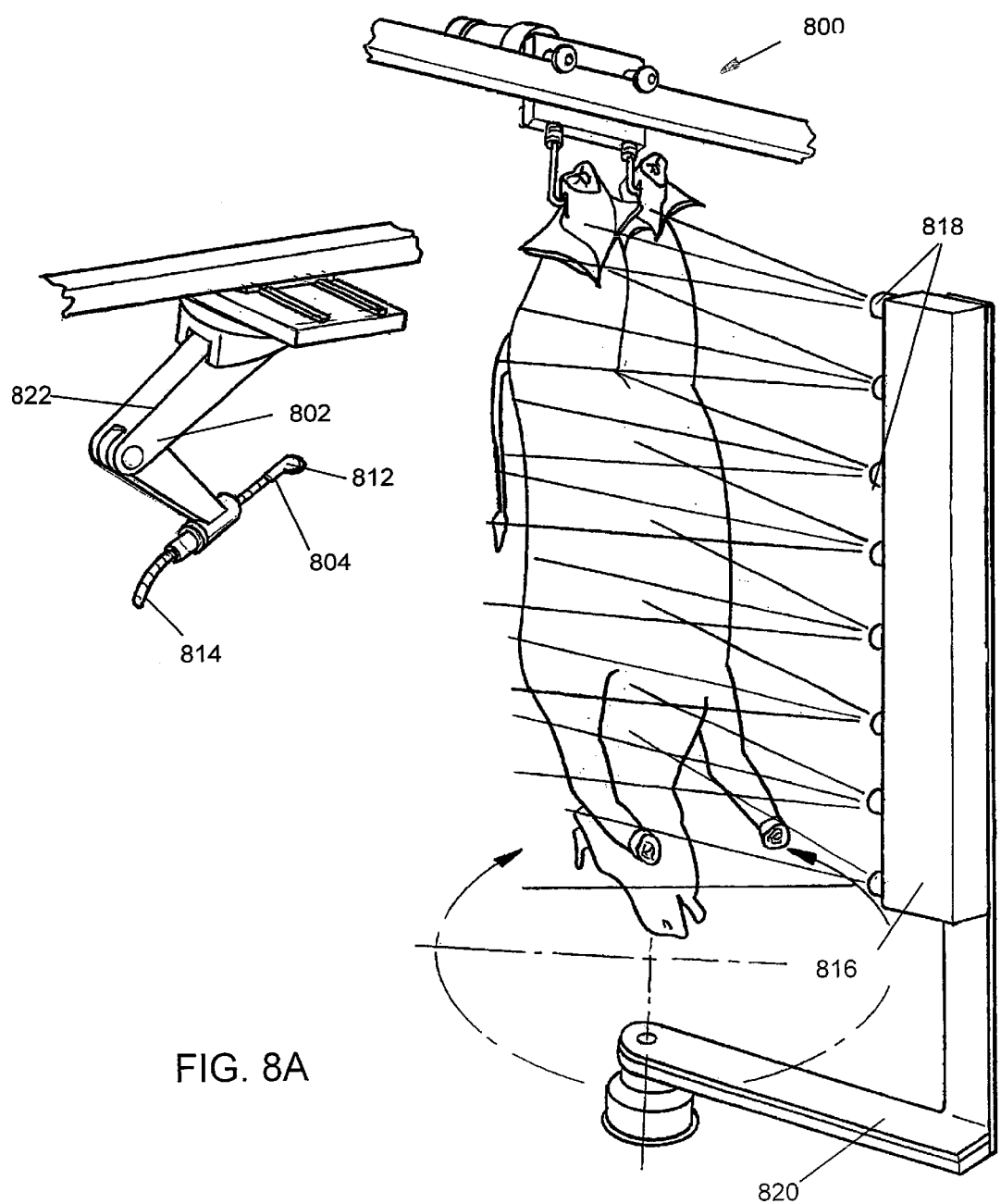
FIGS. 8A and 8B are perspective views of an exemplary process step comprised of marking the animals hide for hide removal and removing the animal's hide.
Figure 8B:
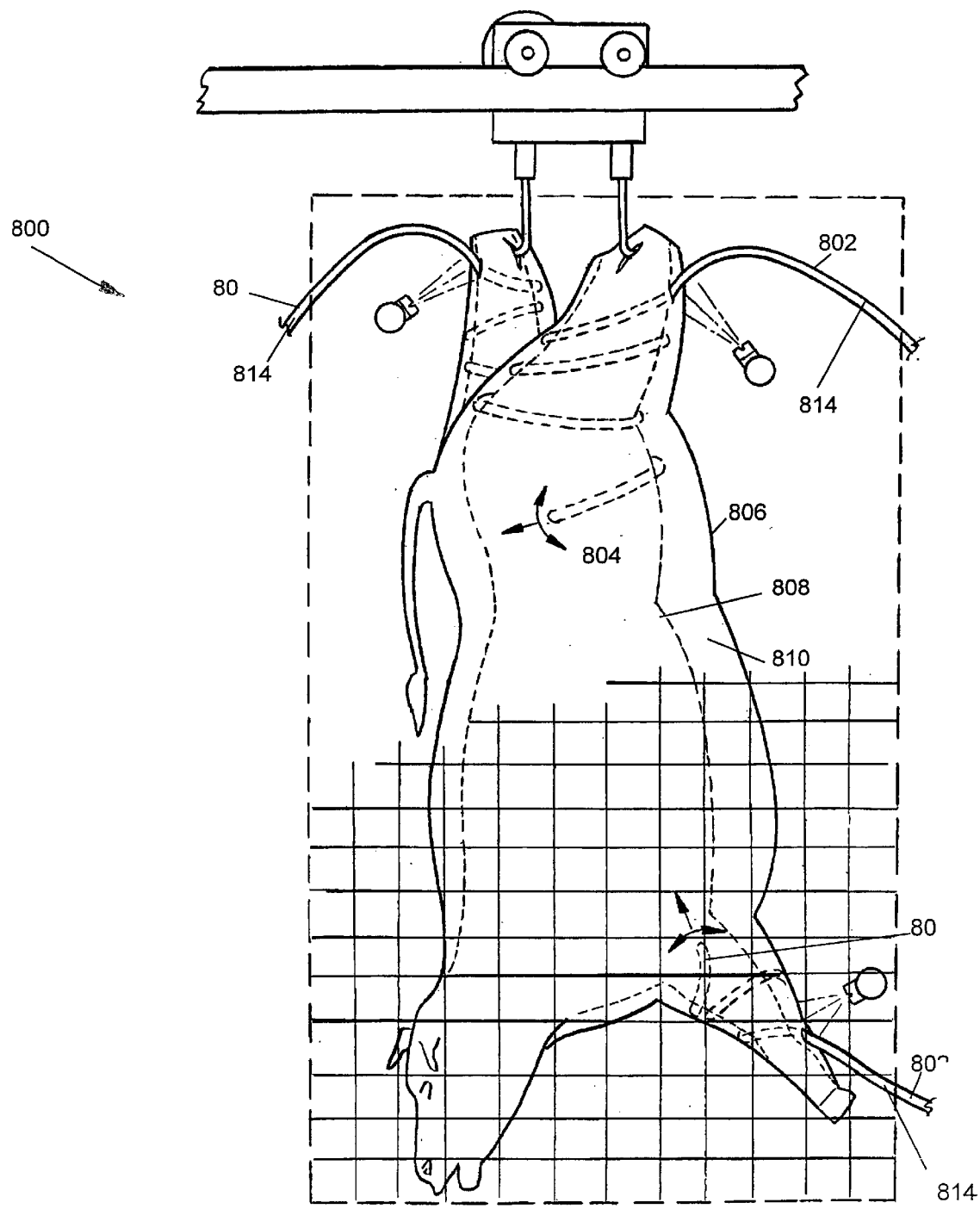

Referring now to FIGS. 8A and 8B, an exemplary processing station employing apparatus in accordance with the present invention for removing the hide of a slaughtered animal is shown. The processing station 800 comprises at least one processing device 802 capable of aseptically separating and removing the hide of an animal from its carcass. Such processing devices are described in U.S. Provisional Patent Application Serial No. 60/142,644, filed Jul. 6, 1999, which is herein incorporated by reference in its entirety. As shown in FIGS. 8A and 8B, the processing device 802 is comprised of one or more cutting members 804 that are inserted between the hide 806 and muscle 808 of the animal's carcass 810. Each cutting member 802 includes a cutting implement 812 suitable for cutting the connecting tissue attaching the hide 806 and muscle 808 while avoiding damage (e.g., cutting, burning, etc.) to the hide 806 and muscle 808. In accordance with the present invention, the cutting member 810 also includes a flexible appendage 814 having one or more articulated segments 816 that may be manipulated so as to determine the path taken by the cutting implement 812 through the connecting tissue layer. In this manner, the cutting member 812 is manipulated robotically in a manner much like existing endoscopic or laparoscopic instruments.

As shown in FIG. 8A, in one embodiment, the processing station 800 may further include a sensing device assembly 816, comprised of a plurality of sensing devices 818 such as cameras or the like mounted to a generally vertical arm assembly 820. The arm assembly 820 may be rotated about the carcass 810 allowing the sensing devices 818 to input information which is communicated to the controller (not shown). Alternately, the sensing devices 818 may remain stationary while the carcass 810 is rotated, or may remain stationary being located at strategic points within the processing station 800 to provide full coverage of the carcass' surface.

As discussed supra, in an exemplary embodiment, the controller may utilize the inputted information to generate a three-dimensional model of the carcass 810. A grid pattern is overlain onto the carcass 810 of a slaughtered animal so that the size, shape, and orientation of the carcass 810 may be determined and points on the carcass 810 where cutting members 804 should be inserted may be ascertained. The controller may then cause the cutting members 804 to be inserted through the hide into the connecting tissue at the ascertained locations, for example, by robotic arm assembly 822 (FIG. 8A), and may guide the cutting members 804 through the connecting tissue layer to separate the hide 806 from the carcass 810. The controller may further use the information received from the sensing device assembly 816 to provide a video display of the carcass. The operator may utilize the video display to monitor operation of the processing station 800. Further, the operator may use the video display so that he or she may manually operate the processing device 802 if this function is not performed automatically by the controller.

It will be appreciated that while a processing device 802 capable of aseptically separating and removing the hide of an animal from its carcass in accordance with U.S. Provisional Patent Application Serial No. 60/142,644 is shown and described herein, other methods and apparatus for removing the hide may be adapted for use with the present invention without departing from the scope and spirit of the invention. For example, in one embodiment, the present invention may be adapted to use a processing device comprised of a conventional downpulling assembly or downpuller for hide removal. Such downpullers grip a previously detached portion of the hide and pull downwardly thereon forcibly pulling the hide from the animal's carcass.

Figure 9:
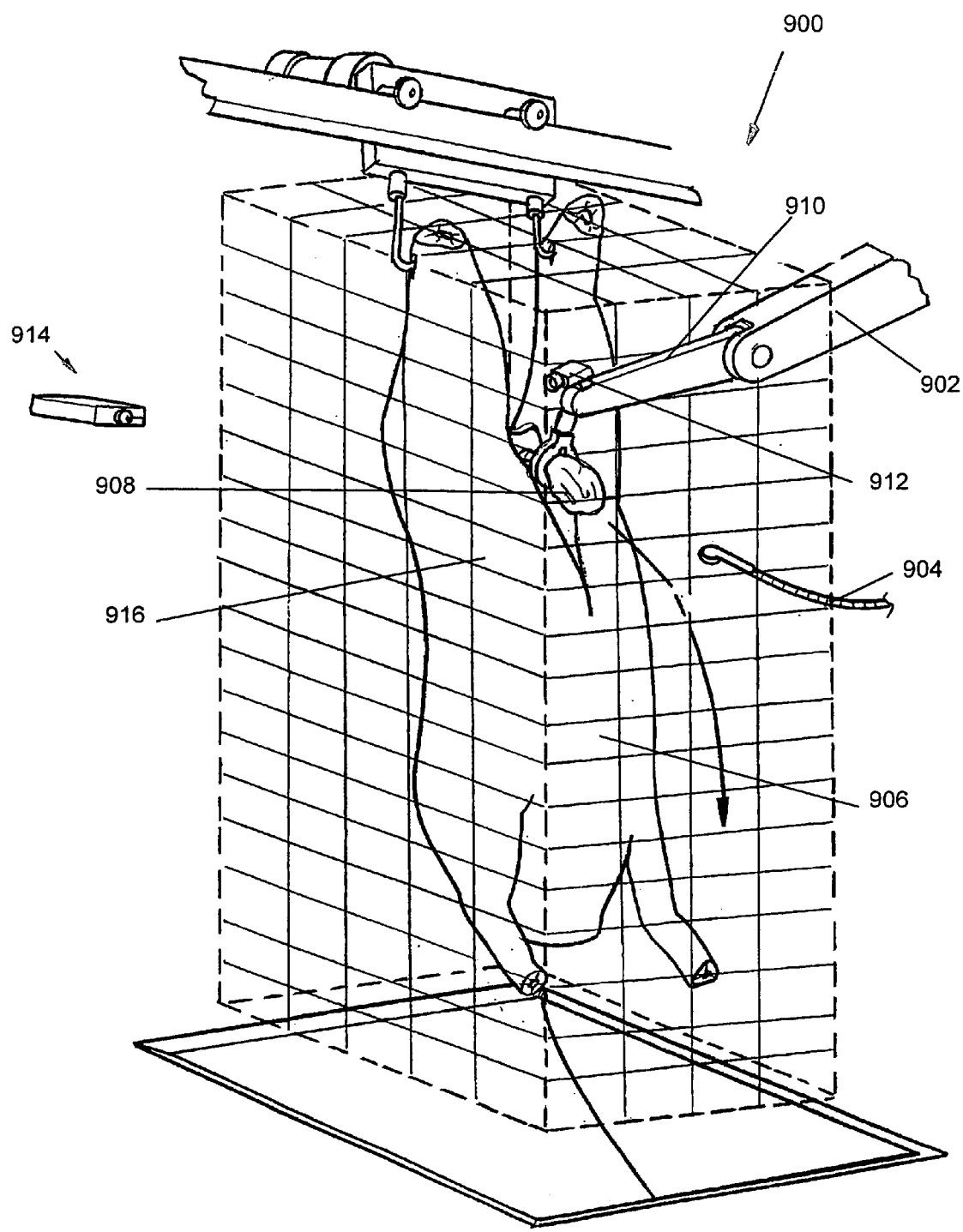
FIG. 9 is a perspective view of an exemplary process step comprised of evisceration of the animal carcass.

Referring now to FIG. 9, an exemplary processing station employing apparatus in accordance with the present invention for eviscerating the animal's carcass is described. The processing station 900 includes a processing device 902 comprised of a cutting member 904 for marking or cutting the carcass's abdomen 906 to provide access to its internal organs 908 and evisceration apparatus 910 for removing the animal's internal organs 908. One or more sensing devices 912 & 914 input information which is communicated to the controller (not shown) controlling the processing device 902. The controller uses the information to locate the position or positions on the abdomen 906 where it should be marked and to locate connecting tissue (i.e., the pluck) that must be severed for removal of the animal's internal organs 908. The controller may then operate the processing device 902 to eviscerate the carcass 916. The controller may further use the information received from the sensing devices 912 & 914 to provide a video display of the carcass 916. The operator may utilize the video display to monitor operation of the processing station 900. Further, the operator may use the video display so that he or she may manually operate the processing device 902 if this function is not performed automatically by the controller.

Figure 10:
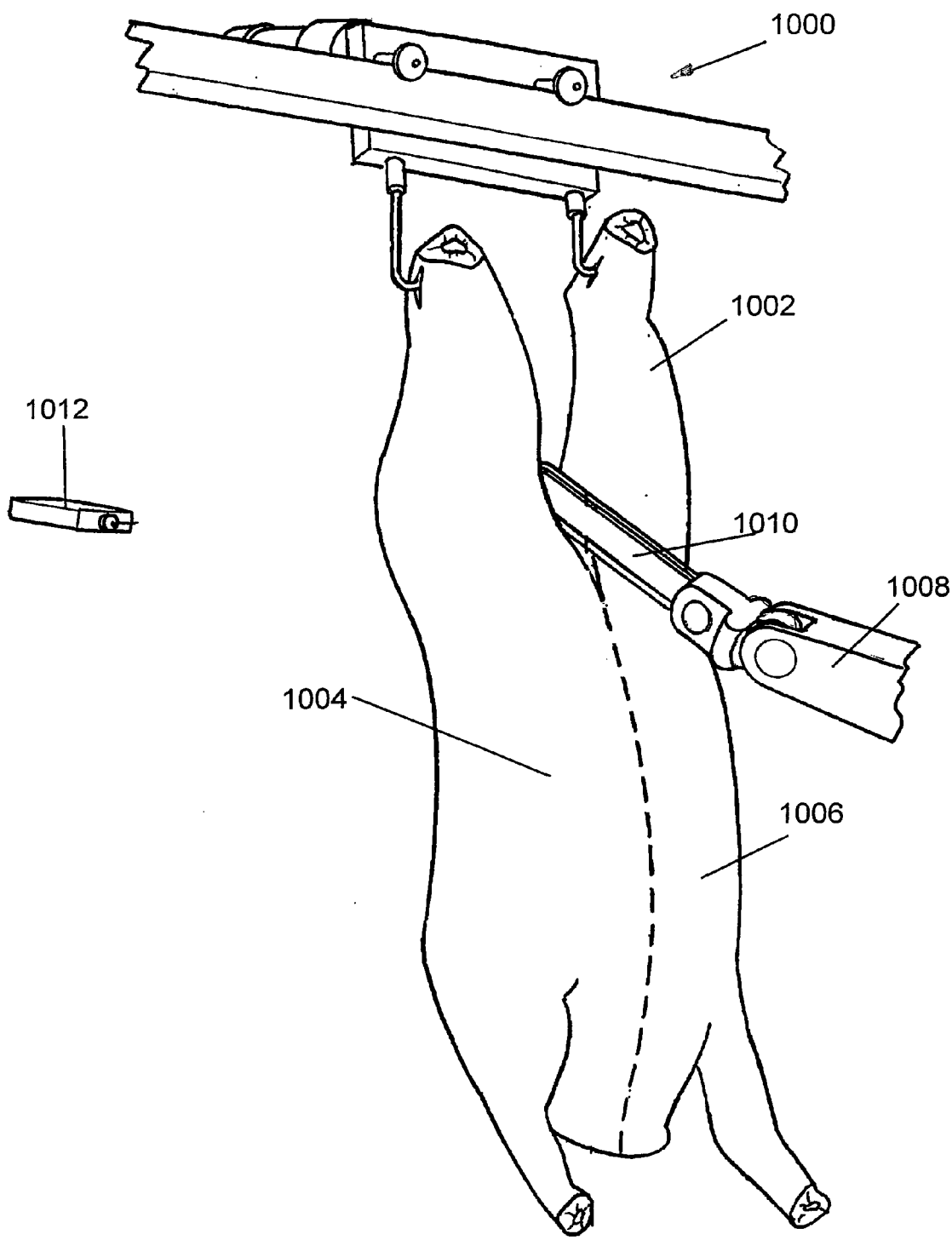
FIG. 10 is a perspective view of an exemplary process step comprised of separation of the carcass into halves or sides.

Referring now to FIG. 10, an exemplary processing station 1000 employing apparatus in accordance with the present invention for trimming the carcass into primal cuts is described. Specifically, in FIG. 10, a beef carcass 1002 is shown being trimmed into two beef sides 1004 & 1006. The processing station 1000 includes a processing device 1008 comprised of a saw 1010 capable of cutting a beef carcass 1002 along its backbone to provide two beef sides 1004 & 1008. One or more sensing devices 1012 input information which is communicated to the controller (not shown) controlling the processing device 1008 which uses the information to position the saw 1010. The controller may further use the information received from the sensing devices 1012 to provide a video display of the carcass. The operator may utilize the video display to monitor operation of the processing station 1000. Further, the operator may use the video display so that he or she may manually operate the processing device 1008 if this function is not performed automatically by the controller.

Figure 11:
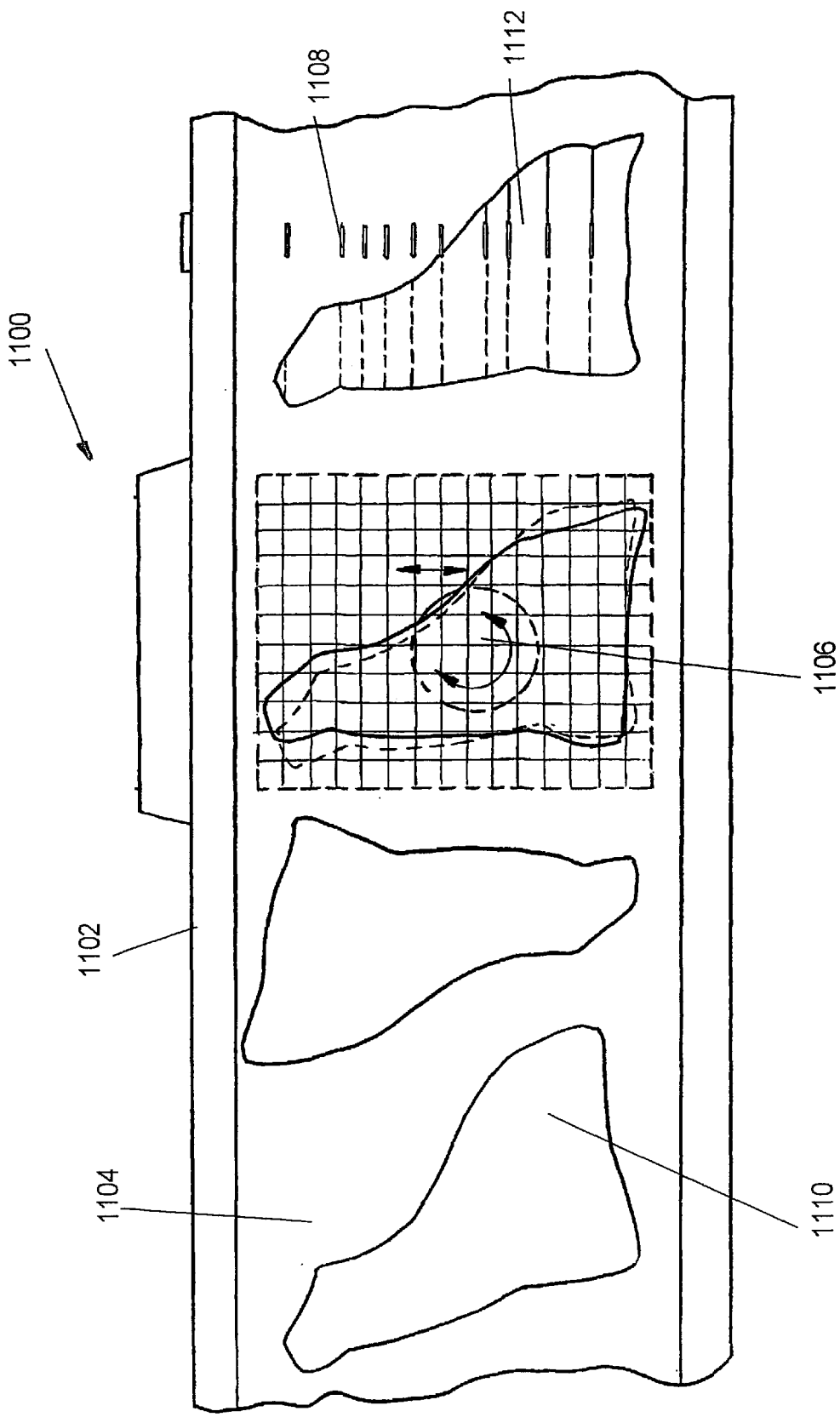
FIG. 11 is a top plan view illustrating use of the method and apparatus of the present invention to trim a primal cut into smaller cuts.

Referring now to FIG. 11, an exemplary processing station employing apparatus in accordance with the present invention for trimming primal cuts into cuts of meat for sale or use is described. The processing station 1100 is comprised of a processing device 1102 including a conveyor system 1104, a turntable assembly 1106 and a trimming assembly 1108. Primal cuts of meat 1110 are transported though the processing station 1100 by the conveyor system 1104 to the trimming assembly 1108 to be trimmed into smaller cuts 1112 for further processing, e.g., additional trimming, packaging, or the like. As shown in FIG. 11, the primal cuts 1110 are non-homogeneous in nature having a variety of shapes, sizes and orientations. One or more sensing devices (not shown) input information which is communicated to the controller controlling the processing device 1102. For instance, as discussed, supra, the controller may, in an exemplary embodiment, utilize the information received from the sensing devices to generate a virtual model of each primal cut. The controller may overlay a grid pattern (shown as 1114) onto the image of carcass received from the sensing device which it may use to determine the shape, size and orientation of the primal cut.

The controller uses the information to orient each primal cut of meat 1110 for trimming by trimming assembly 1108. For example, in the exemplary embodiment shown, the controller may cause the turntable assembly 1106 to rotate the primal cut 1110 so that it may pass through the trimming assembly 1108 in a desired orientation to produce the desired cuts 1112, and/or may adjust the distance between blades of the trimming assembly 1108 depending on the size of the primal cut 1110. The controller may further use the information received from the sensing devices to provide a video display of the primal cut 1110 as it moves along the conveyor 1104. The operator may utilize the video display to monitor operation of the processing station 1100. Further, the operator may use the video display so that he or she may manually operate the processing device 1102 if this function is not performed automatically by the controller.

In FIGS. 7 through 11, processing stations are shown which are exemplary of the types of processing stations that may be developed for use as part of the present invention. However, it should be appreciated that those of ordinary skill in the art may develop other processing apparatus based on the foregoing description of the present invention depending on the particular requirements of the processing plant in which the apparatus is used, the type of animal being processed, or like considerations, and development of such apparatus would not depart from the scope and spirit of the present invention.

It is believed that the method and apparatus for slaughtering and processing animals of the present invention and many of the attendant advantages thereof will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for processing the carcass of an animal, comprising:
    sensing at least a portion of an animal carcass being processed utilizing a sensing assembly, the sensing assembly being capable of determining the orientation of the animal carcass portion;
    identifying a point on the animal carcass portion to perform at least one processing step based on the determined orientation of the animal carcass portion sensed by the sensing assembly; and
    performing the processing step.

2. The method as recited in claim 1, wherein the sensing assembly comprises an optical sensing assembly.

3. The method as recited in claim 2, wherein the optical sensing assembly comprises at least one camera.

4. The method as recited in claim 1, wherein the optical sensing assembly is capable of providing a three-dimensional representation of the animal carcass from which the carcass's orientation can be determined.

5. The method as recited in claim 1, wherein performing the processing step comprises controlling a robotic processing device to perform the processing step.

6. The method as recited in claim 4, wherein the robotic processing device includes at least one of a knife and a saw.

7. The method as recited in claim 5, wherein the processing step comprises at least one of stunning the animal, slaughtering the animal, bleeding the animal, removal of the hide from the animal carcass, removal of the animal carcass's head, separation of the animals rectum, evisceration, removal of bones from the animal carcass portion, trimming of the animal carcass portion.

8. A method for processing a non-homogeneous body, comprising:
    sensing at least a portion of an non-homogeneous body being processed utilizing a sensing assembly, the sensing assembly being capable of determining the orientation of the non-homogeneous body portion;
    identifying a point on the non-homogeneous body portion to perform at least one processing step based on the determined orientation of the non-homogeneous body portion from the scan; and
    performing the processing step.

9. The method as recited in claim 8, wherein the sensing assembly comprises an optical sensing assembly.

10. The method as recited in claim 8, wherein the optical sensing assembly comprises at least one camera.

11. The method as recited in claim 8, wherein the optical sensing assembly is capable of providing a three-dimensional representation of the animal carcass from which the carcass's orientation can be determined.

12. The method as recited in claim 8, wherein performing the processing step comprises controlling a robotic processing device to perform the processing step.

13. The method as recited in claim 12, wherein the robotic processing device includes at least one of a knife and a saw.

14. The method as recited in claim 12, wherein the non-homogeneous body comprises the carcass of an animal.

15. The method as recited in claim 14, wherein the processing step comprises at least one of stunning the animal, slaughtering the animal, bleeding the animal, removal of the hide from the animal carcass, removal of the animal carcass's head, separation of the animals rectum, evisceration, removal of bones from the animal carcass portion, trimming of the animal carcass portion.

16. An apparatus for processing the carcass of an animal, comprising:

a sensing device for sensing at least a portion of an animal carcass being processed suitable for determining the orientation of the animal carcass portion, a controller operably coupled to the sensing device, said controller being capable of identifying a location on the animal carcass portion to perform at least one processing step based on the determined orientation; and a processing assembly capable of performing the processing step.

17. The apparatus as recited in claim 16, wherein the sensing device comprises an optical sensing assembly.

18. The apparatus as recited in claim 16, wherein the optical sensing assembly comprises at least one camera.

19. The apparatus as recited in claim 16, wherein the optical sensing assembly is capable of providing a three-dimensional representation of the animal carcass from which the carcass's orientation can be determined.

20. The method as recited in claim 16, wherein the processing assembly includes at least one of a knife and a saw.

21. The apparatus as recited in claim 16, wherein the processing assembly includes a robotic arm.

22. The apparatus as recited in claim 16, wherein the processing assembly includes at least one of an internal hide removing assembly and a down-puller for removing the hide from the animal carcass.

23. A method for processing the carcass of an animal, comprising:

sensing at least a portion of an animal carcass being processed utilizing a sensing assembly;

determining the orientation of the sensed animal carcass portion;

identifying a point on the animal carcass portion for performing at least one processing step based on the determined orientation of the animal carcass portion sensed by the sensing assembly; and controlling a robotic processing device for performing the at least one processing step, wherein the at least one processing step comprises at least one of stunning the animal, slaughtering the animal, bleeding the animal, removal of the hide from the animal carcass, removal of the animal carcass's head, separation of the animals rectum, evisceration, removal of bones from the animal carcass portion, and trimming of the animal carcass portion.

24. The method as recited in claim 23, wherein the step of sensing at least a portion of an animal carcass comprises generating a three-dimensional virtual model of the sensed animal carcass portion.

25. The method as recited in claim 24, wherein the step of sensing at least a portion of the animal carcass further comprises overlaying a grid pattern onto the three-dimensional model.

26. The method as recited in claim 25, wherein the step of identifying a point on the animal carcass portion for performing at least one processing step comprises identifying a grid of the grid pattern in which the processing step is to be performed.

27. The method as recited in claim 23, wherein the step of sensing at least a portion of the animal carcass further comprises overlaying a grid pattern onto the animal carcass portion.

28. The method as recited in claim 27, wherein the step of identifying a point on the animal carcass portion to perform at least one processing step comprises identifying a grid of the grid pattern in which the processing step is to be performed.

29. The method as recited in claim 23, wherein the processing step is performed using a cutting member manipulated robotically in an endoscopic manner.

30. A method for processing the carcass of an animal, comprising:

moving the animal carcass to a first processing station;

sensing at least a portion of an animal carcass being processed utilizing a sensing assembly for determining the orientation of the animal carcass portion;

identifying a first point on the animal carcass portion for performing a first processing step based on the determined orientation of the animal carcass portion sensed by the sensing assembly;

controlling a robotic processing device for performing the first processing step, the first processing step comprising one of stunning the animal, slaughtering the animal, bleeding the animal carcass, removal of the hide from the animal carcass, removal of the head of the animal carcass, separation of the rectum from the animal carcass, evisceration, removal of bones from the animal carcass, and trimming of the animal carcass;

moving the animal carcass to a second processing station;

sensing at least a portion of an animal carcass being processed utilizing a sensing assembly for determining the orientation of the animal carcass portion;

identifying a second point on the animal carcass portion for performing a second processing step based on the determined orientation of the animal carcass portion sensed by the sensing assembly; and controlling a robotic processing device for performing the second processing step, the second processing step comprising a second of stunning the animal, slaughtering the animal, bleeding the animal carcass, removal of the hide from the animal carcass, removal of the head of the animal carcass, separation of the rectum from the animal carcass, evisceration, removal of bones from the animal carcass, and trimming of the animal carcass.

31. The method as recited in claim 30, wherein the steps of sensing at least a portion of an animal carcass comprise generating a three-dimensional virtual model of the animal carcass.

32. The method as recited in claim 31, wherein the steps of sensing at least a portion of the animal carcass further comprise overlaying a grid pattern onto the three-dimensional model.

33. The method as recited in claim 32, wherein the step of identifying a point on the animal carcass portion for performing a first processing step and the step of identifying a point on the animal carcass portion for performing a second processing step each comprise identifying a grid of the grid pattern in which the processing step is to be performed.

34. The method as recited in claim 30, wherein the steps of sensing at least a portion of the animal carcass further comprise overlaying a grid pattern onto the carcass.

35. The method as recited in claim 34, wherein the step of identifying a point on the animal carcass portion for performing a first processing step and the step of identifying a point on the animal carcass portion for performing a second processing step each comprise identifying a grid of the grid pattern in which the processing step is to be performed.

36. The method as recited in claim 30, wherein the at least one of the first processing step and the second processing step is performed using a cutting member manipulated robotically in an endoscopic manner.

37. A method for processing the carcass of an animal, comprising:

sensing at least a portion of an animal carcass being processed utilizing a sensing assembly;

determining the orientation of the sensed animal carcass portion;

identifying a point on the animal carcass portion for performing at least one processing step based on the determined orientation of the animal carcass portion sensed by the sensing assembly; and controlling a robotic processing device for performing the at least one processing step, wherein the at least one processing step is performed using a cutting member manipulated robotically in an endoscopic manner.

38. The method as recited in claim 37, wherein the step of sensing at least a portion of an animal carcass comprises generating a three-dimensional virtual model of the sensed animal carcass portion.

39. The method as recited in claim 38, wherein the step of sensing at least a portion of the animal carcass further comprises overlaying a grid pattern onto the three-dimensional model.

40. The method as recited in claim 39, wherein the step of identifying a point on the animal carcass portion for performing at leas, one processing step comprises identifying a grid of the grid pattern in which the processing step is to be performed.

41. The method as recited in claim 37, wherein the step of sensing at least a portion of the animal carcass further comprises overlaying a grid pattern onto the animal carcass portion.

42. The method as recited in claim 41, wherein the step of identifying a point on the animal carcass portion to perform at least one processing step comprises identifying a grid of the grid pattern in which the processing step is to be performed.

* * * * *